United States Patent
Cudak et al.

(10) Patent No.: US 9,736,810 B1
(45) Date of Patent: Aug. 15, 2017

(54) SYSTEMS AND METHODS FOR MANAGING USER NOTIFICATIONS BASED ON USER INTERACTION WITH A COMPUTING DEVICE

(71) Applicant: Lenovo Enterprise Solutions (Singapore) Pte. Ltd., New Tech Park (SG)

(72) Inventors: Gary D. Cudak, Wake Forest, NC (US); Jennifer J. Lee-Baron, Morrisville, NC (US); Amy L. Rose, Chapel Hill, NC (US); John S. Crowe, Durham, NC (US); Nathan J. Peterson, Oxford, NC (US); Bryan L. Young, Tualatin, OR (US)

(73) Assignee: Lenovo Enterprise Solutions (Singapore) Pte. Ltd., New Tech Park (SG)

( * ) Notice: Subject to any disclaimer, the term of this patent is extended or adjusted under 35 U.S.C. 154(b) by 0 days.

(21) Appl. No.: 15/192,189

(22) Filed: Jun. 24, 2016

(51) Int. Cl.
*H04W 68/00* (2009.01)
*H04W 4/00* (2009.01)
*H04L 29/08* (2006.01)

(52) U.S. Cl.
CPC ............ *H04W 68/00* (2013.01); *H04L 67/22* (2013.01); *H04W 4/008* (2013.01)

(58) Field of Classification Search
CPC ........ H04W 68/00; H04W 4/008; H04L 67/22
USPC .................................................. 455/458, 466
See application file for complete search history.

(56) References Cited

U.S. PATENT DOCUMENTS

| | | | |
|---|---|---|---|
| 7,515,054 B2* | 4/2009 | Torch | A61B 3/0066 340/573.1 |
| 2012/0094700 A1* | 4/2012 | Karmarkar | G06F 3/013 455/466 |
| 2013/0150004 A1* | 6/2013 | Rosen | H04W 8/22 455/414.1 |
| 2015/0097772 A1* | 4/2015 | Starner | G06F 3/013 345/158 |
| 2015/0269009 A1* | 9/2015 | Faaborg | G06F 9/546 719/315 |
| 2016/0062540 A1* | 3/2016 | Yang | G06F 3/0481 345/173 |
| 2016/0117947 A1* | 4/2016 | Misu | G09B 9/04 434/62 |

OTHER PUBLICATIONS

Why your phone is driving you to distraction: The sound of a text alert 'can divert our attention as much as reading it', Sophie Freeman, DailyMail.com; Jul. 14, 2015; URL: http://www.dailymail.co.uk/sciencetech.article-3160514/Why-phone-driving-sound-text-alert-divert-attention-reading-it.html?, accessed Jun. 9, 2016.

(Continued)

*Primary Examiner* — Sharad Rampuria
(74) *Attorney, Agent, or Firm* — Olive Law Group, PLLC

(57) ABSTRACT

Systems and methods for managing user notifications based on user interaction with a computing device are disclosed. According to an aspect, a method includes measuring user interaction of a predetermined type with the computing device. The method also includes determining whether the measure of user interaction meets a predetermined criterion. Further, the method includes disabling user notification of received communications in response to determining that the measure of user interaction meets the predetermined criterion.

19 Claims, 2 Drawing Sheets

(56) References Cited

OTHER PUBLICATIONS

The Lamp That Can Tell How Focused You Are, Kari Paul, Sep. 28, 2015, http://motherboard.vice.com/read/the-lamp-that-can-tell-how-focused-you . . . , accessed Jun. 9, 2016.

* cited by examiner

SYSTEMS AND METHODS FOR MANAGING USER NOTIFICATIONS BASED ON USER INTERACTION WITH A COMPUTING DEVICE

TECHNICAL FIELD

The present subject matter relates to computing device communications. More specifically, the present subject matter relates to systems and methods for managing user notifications based on user interaction with a computing device.

BACKGROUND

Many smartphones and other computing devices include functionality for notifying users of incoming telephone calls, emails, text messages, and other communications. For example, a typical smartphone can display notification of receipt of a text message. The notification can indicate the sender and the content of the message. The user can then interact with the presented notification to thereby open an interface for responding to the received communication.

Notifications can be beneficial to users, because the user is notified of a communication that may need immediate attention. However, oftentimes the user is interrupted by notifications of communications that do not require immediate attention. In such instances, the notification can be highly distracting and divert attention from other tasks. A user may optionally disable notifications when he or she is busy with another task, but this is another inconvenience and the user may forget to do so. In view of these difficulties, there is a need for improved techniques for managing notifications.

SUMMARY

Disclosed herein are systems and methods for managing user notifications based on user interaction with a computing device. According to an aspect, a method includes measuring user interaction of a predetermined type with the computing device. The method also includes determining whether the measure of user interaction meets a predetermined criterion. Further, the method includes disabling user notification of received communications in response to determining that the measure of user interaction meets the predetermined criterion.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

Figure 1:
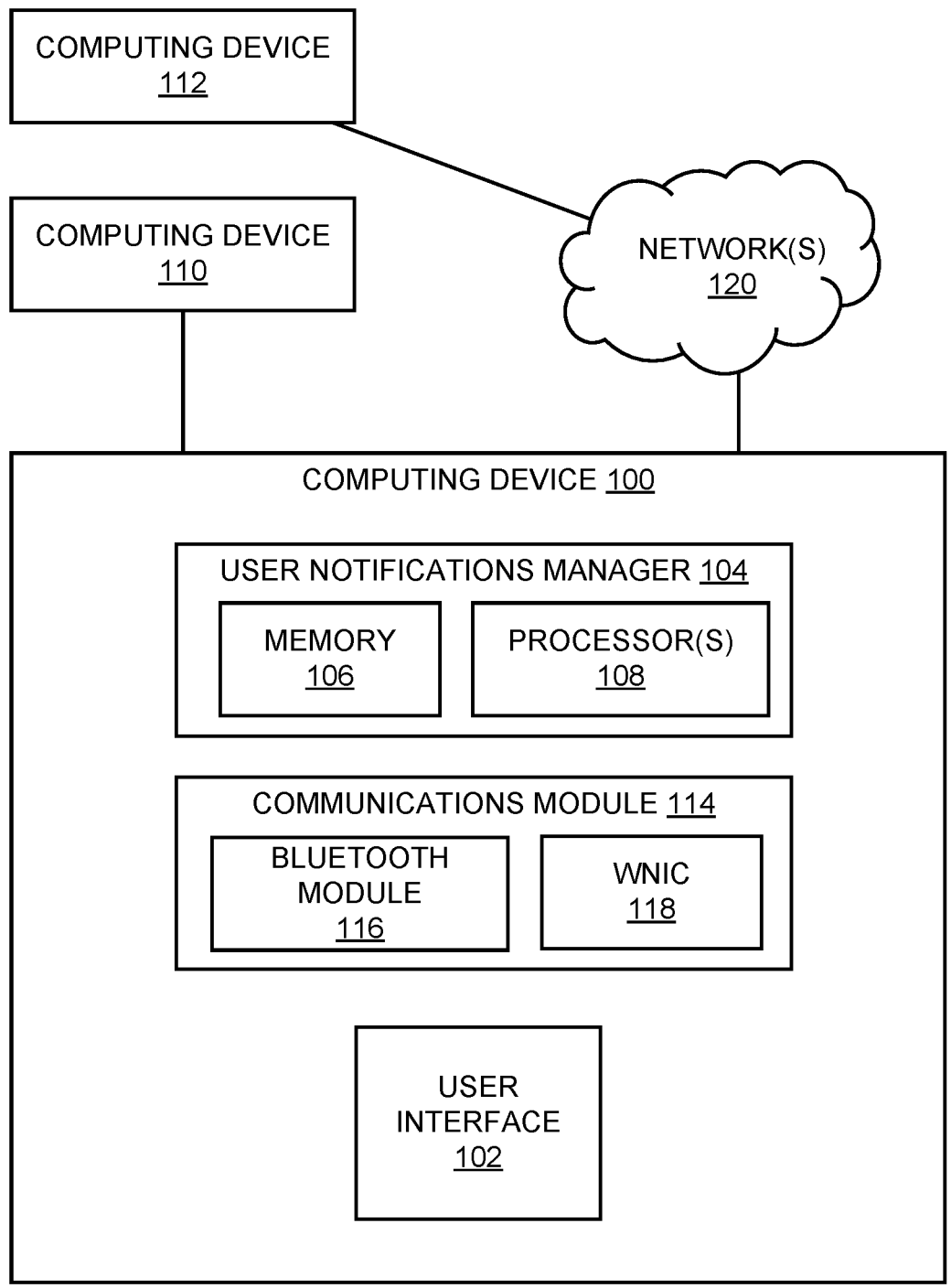
FIG. 1 is a schematic diagram of an example system for managing user notifications based on user interaction with a computing device in accordance with embodiments of the present disclosure.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as computing devices. A computing device may be implemented in programmable hardware devices such as processors, digital signal processors, central processing units, field programmable gate arrays, programmable array logic, programmable logic devices, cloud processing systems, or the like. The computing devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executable of an identified device need not be physically located together, but may comprise disparate instructions stored in different locations which, when joined logically together, comprise the computing device and achieve the stated purpose of the computing device.

An executable code of a computing device may be a single instruction, or many instructions, and may even be distributed over several different code segments, among different applications, and across several memory devices. Similarly, operational data may be identified and illustrated herein within the computing device, and may be embodied in any suitable form and organized within any suitable type of data structure. The operational data may be collected as a single data set, or may be distributed over different locations including over different storage devices, and may exist, at least partially, as electronic signals on a system or network.

The described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

As referred to herein, the term "user interface" is generally a system by which users interact with a computing device. A user interface can include an input for allowing users to manipulate a computing device, and can include an output for allowing the computing device to present information and/or data, indicate the effects of the user's manipulation, etc. An example of a user interface on a computing device includes a graphical user interface (GUI) that allows users to interact with programs or applications in more ways than typing. A GUI typically can offer display objects, and visual indicators, as opposed to text-based interfaces, typed command labels or text navigation to represent information and actions available to a user. For example, a user interface can be a display window or display object, which is selectable by a user of a computing device for interaction. In another example, the user can use any other suitable user interface of a computing device, such as a keypad, to select the display icon or display object. For example, the user can use a track ball or arrow keys for moving a cursor to highlight and select the display object.

As used herein, the term "memory" is generally a storage device of a computing device. Examples include, but are not limited to, ROM and RAM.

The device or system for performing one or more operations on a memory of a computing device may be a software, hardware, firmware, or combination of these. The device or the system is further intended to include or otherwise cover all software or computer programs capable of performing the various heretofore-disclosed determinations, calculations, or the like for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl, or other suitable programming languages.

As referred to herein, the term "computing device" should be broadly construed. It can include any type of computing device, for example, a smart phone, a cell phone, a pager, a personal digital assistant (PDA, e.g., with GPRS NIC), a mobile computer with a smartphone client, or the like. A computing device can also include any type of conventional computer, for example, a desktop computer or a laptop computer. A typical mobile device is a wireless data access-enabled device (e.g., an iPHONE® smartphone, a BLACK-BERRY® smart phone, a NEXUS ONE™ smart phone, an iPAD™ device, or the like) that is capable of sending and receiving data in a wireless manner using communications protocols such as the Internet Protocol (IP), BLU-ETOOTH®, WI-FI®, and the wireless application protocol (WAP). This allows users to access information via wireless devices, such as smart phones, mobile phones, pagers, two-way radios, communicators, and the like. Wireless data access is supported by many wireless networks, including, but not limited to, CDPD, CDMA, GSM, PDC, PHS, TDMA, FLEX, ReFLEX, iDEN, TETRA, DECT, DataTAC, Mobitex, EDGE and other 2G, 3G, 4G and LTE technologies, and it operates with many handheld device operating systems, such as PalmOS, EPOC, Windows CE, FLEXOS, OS/9, JavaOS, iOS and Android. Typically, these devices use graphical displays and can access the Internet (or other communications network) on so-called mini- or micro-browsers, which are web browsers with small file sizes that can accommodate the reduced memory constraints of wireless networks. In a representative embodiment, the mobile device is a cellular telephone or smart phone that operates over GPRS (General Packet Radio Services), which is a data technology for GSM networks. In addition to a conventional voice communication, a given mobile device can communicate with another such device via many different types of message transfer techniques, including SMS (short message service), enhanced SMS (EMS), multi-media message (MMS), email WAP, paging, or other known or later-developed wireless data formats. Although many of the examples provided herein are implemented on a mobile device, the examples may similarly be implemented on any suitable computing device.

As referred to herein, a "user interface" is generally a system by which users interact with a computing device. A user interface can include an input for allowing users to manipulate a computing device, and can include an output for allowing the system to present information and/or data, indicate the effects of the user's manipulation, etc. An example of a user interface on a computing device (e.g., a mobile device) includes a graphical user interface (GUI) that allows users to interact with programs in more ways than typing. A GUI typically can offer display objects, and visual indicators, as opposed to text-based interfaces, typed command labels or text navigation to represent information and actions available to a user. For example, an interface can be a display window or display object, which is selectable by a user of a mobile device for interaction. The display object can be displayed on a display screen of a mobile device and can be selected by and interacted with by a user using the interface. In an example, the display of the mobile device can be a touch screen, which can display the display icon. The user can depress the area of the display screen at which the display icon is displayed for selecting the display icon. In another example, the user can use any other suitable interface of a mobile device, such as a keypad, to select the display icon or display object. For example, the user can use a track ball or arrow keys for moving a cursor to highlight and select the display object.

Operating environments in which embodiments of the presently disclosed subject matter may be implemented are also well-known. In a representative embodiment, a computing device, such as a mobile device, is connectable (for example, via WAP) to a transmission functionality that varies depending on implementation. Thus, for example, where the operating environment is a wide area wireless network (e.g., a 2.5G network, a 3G network, or a 4G network), the transmission functionality comprises one or more components such as a mobile switching center (MSC) (an enhanced ISDN switch that is responsible for call handling of mobile subscribers), a visitor location register (VLR) (an intelligent database that stores on a temporary basis data required to handle calls set up or received by mobile devices registered with the VLR), a home location register (HLR) (an intelligent database responsible for management of each subscriber's records), one or more base stations (which provide radio coverage with a cell), a base station controller (BSC) (a switch that acts as a local concentrator of traffic and provides local switching to effect handover between base stations), and a packet control unit (PCU) (a device that separates data traffic coming from a mobile device). The HLR also controls certain services associated with incoming calls. Of course, the presently disclosed subject matter may be implemented in other and next-generation mobile networks and devices as well. The mobile device is the physical equipment used by the end user, typically a subscriber to the wireless network. Typically, a mobile device is a 2.5G-compliant device or 3G-compliant device (or the proposed 4G-compliant device)

that includes a subscriber identity module (SIM), which is a smart card that carries subscriber-specific information, mobile equipment (e.g., radio and associated signal processing devices), a user interface (or a man-machine interface (MMI), and one or more interfaces to external devices (e.g., computers, PDAs, and the like). The mobile device may also include a memory or data store.

The present disclosure is now described in more detail. For example, FIG. 1 illustrates a schematic diagram of an example system for managing user notifications based on user interaction with a computing device in accordance with embodiments of the present disclosure. Referring to FIG. 1, the system includes a computing device 100 configured to measure user interaction of a predetermined type with the computing device 100, to determine whether the measure of user interaction meets a predetermined criterion, disable user notification of received communications in response to determining that the measure of user interaction meets the predetermined criterion.

The computing device 100 includes a user interface 102 with which a user of the computing device 100 may interact with the computing device 100. For example, user interaction may include, but is not limited to, typing on a keyboard of the computing device 100, touching a touchscreen display of the computing device 100 to enter input, operating the computing device 100 to output media (e.g., video, music, a slide show, etc.) to the user, interacting with an application (i.e., a program) residing on the computing device 100, and the like.

The computing device 100 includes a user notifications manager 104 configured to measure user interaction of a predetermined type with the computing device 100. The user notifications manager 104 can be operably connected to the user interface 102 for measuring user interaction of a predetermined type with the computing device 100. In an example, the user notifications manager 104 can interface with the user interface 102 to determine a rate at which the user is interacting with the computing device 100. For example, the user notifications manager 104 may determine a rate at which the user is typing on a keyboard of the computing device 100 or any other part of the computing device 100. In this example, the user notifications manager 104 may determine whether the measure of the typing rate meets a predetermined criterion, such as whether the keystroke rate is above a predetermined keystroke rate. As an example, the user notifications manager 104 may determine whether the number of keystrokes exceed a 10 within a 10 second period or other any other suitable keystroke rate. This rate of user interaction may be any rate selected, because it is at a rate at which it can be assumed that the user is engaged with the computing device at a level such that the user does not want to be interrupted with a notification. The user notifications manager 104 may subsequently disable user notification of received communications in response to determining that the measure of user interaction meets the predetermined criterion. For example, the user notifications manager 104 may disable user notification of receipt of one or more of telephone calls, text messages, instant messages, emails, and the like.

In accordance with embodiments, user interaction with a computing device may be measured based on a biometric reading of a user. For example, the computing device 100 may be configured with one or more sensors and equipment for reading the electroencephalogram (EEG) or brainwave activity of the user of the computing device 100. Techniques for reading the EEG of a person are known to those of skill in the art. The user notifications manager 104 may receive the EEG reading and determine a measure of user interaction with the computing device 100 based on the EEG reading. Subsequently, the user notifications manager 104 may disable user notification of received communications in response to determining that the EEG reading meets a predetermined criterion. For example, user notifications may be disabled in response to determining that the EEG reading is above a predetermined level. The user notifications manager 104 may continue to monitor the EEG reading and enable user notification when the EEG reading is less than the predetermined level.

In accordance with embodiments, user interaction with a computing device may be measured based on interaction of a user with one or both of work and school related content presented on the computing device. For example, the user notifications manager 104 may be configured to recognize when the computing device 100 is running a work or school related application and that the user is interacting with the application. In an example, the user may be interacting with a word processing application. In this instance, it may be assumed that the user does not want to be interrupted with notifications. In response to recognizing or determining that the work or school related application is running and/or that the user is interacting with the application, the user notifications manager 104 may disable user notification of received communications. The user notifications manager 104 may continue to monitor whether the application is still running and/or whether the user is interacting with it, and enable user notification when the application is not running or the user is not interacting with the application.

In accordance with embodiments, user interaction with a computing device may be measured based on tracked eye movement of a user of the computing device. For example, the computing device 100 may include a video camera or other equipment capable of being used for tracking eye movement of the user. Further, the user notifications manager 104 may be configured to determine that the user is reading based on the tracked eye movement. In this scenario, it may be assumed that the user does not want to be interrupted by notifications. In response to determining that the user is reading based on the tracked eye movement, the user notifications manager 104 may disable user notification of received communications. The user notifications manager 104 may continue to monitor eye movement and determine that the user is not moving based on the eye movement. In response to determining that the user is not reading, the user notifications manager 104 may enable user notifications.

In accordance with embodiments, a user may control the type of user interactions and the criterion for disabling or enabling user notification of received communications. For example, the user interface 102 may display an interface with which a user may interact for selecting user interaction types. The user may input selection of one or more of the types. The user notifications manager 104 may subsequently disable and enable user notifications based on the selected user interaction types. The user may also input predetermined criterion, such as the keystroke rate at which user notifications are disabled.

Figure 2:
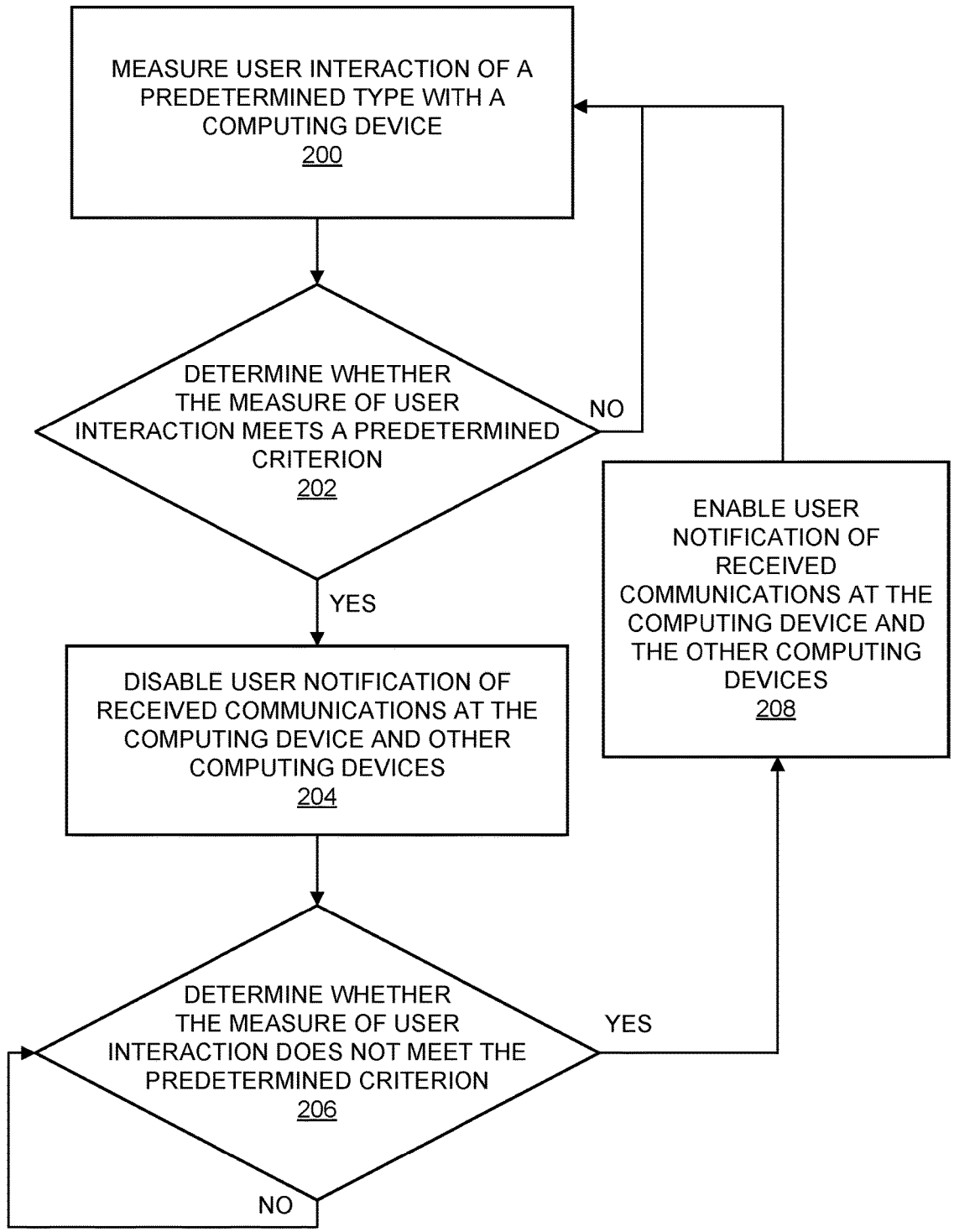
FIG. 2 is a flowchart of an example method for managing user notifications based on user interaction with a computing device in accordance with embodiments of the present disclosure.

FIG. 2 illustrates a flowchart of an example method for managing user notifications based on user interaction with a computing device in accordance with embodiments of the present disclosure. The method is described with reference to the system shown in FIG. 1; however, it should be understood that the method may similarly be applied to other suitable systems. The method may be implemented by the user notifications manager 104 of the computing device 100. The user notifications manager 104 may include hardware, software, firmware, or combinations thereof. For example, the user notifications manager 104 shown in FIG. 1 may include memory 106 and one or more processors 108.

Referring to FIG. 2, the method includes measuring 200 user interaction of a predetermined type with a computing device. For example, the user notifications manager 104 shown in FIG. 1 can measure a rate of user interaction with the user interface 102.

The method of FIG. 2 also includes determining 202 whether the measure of user interaction meets a predetermined criterion. Continuing the aforementioned example, the user notifications manager 104 can determine whether the rate of user interaction with the user interface 102 meets a predetermined rate. If it is determined that the measure of user interaction does not meet the predetermined criterion, the method returns to block 200. Otherwise, the method proceeds to block 204.

Further, the method of FIG. 2 includes disabling 204 user notification of received communications at the computing device and other computing devices in response to determining that the measure of user interaction meets the predetermined threshold. Continuing the aforementioned example, the user notifications manager 104 can disable notifications of calls, emails, text messages, and instant messages on the computing device 100 and other computing devices 110 and 112 in response to determining that the rate of user interaction with the user interface 102 meets the predetermined rate. In this example, the user notifications manager 104 at the computing device 110 may communicate instructions to the other computing devices 110 and 112 to disable user notification of received communications at those computing devices 110 and 112. It is noted that although only computing devices 110 and 112 are shown in FIG. 1, any suitable number of other computing devices may also be instructed to disable user notifications. Also, it is noted that in this example computing devices 110 and 112 are operated by the user of computing device 100.

Communications to computing devices 110 and 112 may be sent by any suitable communications technique. For example, the computing device 100 may include a communications module 114 having a BLUETOOTH® module 116 and a wireless network interface controller (WNIC) 118. The user notifications manager 104 may suitable communicate instructions to computing device 110 by use of the BLUETOOTH® module 116. Further, the user notifications manager 104 may suitable communicate instructions to computing device 112 by use of the WNIC 118. Communications to computing device 112 may be via one or more networks 120.

The method of FIG. 2 includes determining 206 whether the measure of user interaction does not meet the predetermined criterion. Continuing the aforementioned example, the user notifications manager 104 may continue to measure user interactions and determine whether the measure does not meet the predetermined criterion. In response to determining that the measure does not meet the predetermined criterion, the method may enable 208 user notification of received communications at the computing device and the other computing devices. Otherwise, the method may continue with determining 206 whether the measure does not meet the predetermined criterion.

It is noted that the computing device implemented the functionality described herein may be communicating with any suitable computing device such as, but not limited to, a smartphone, router, laptop computer, desktop computer, or the like.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the present disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
   at a computing device:
   measuring user interaction of a predetermined type with the computing device,
   wherein the user interaction is one of a user typing on a keyboard of the computing device and
   a biometric reading of a user of the computing device;
   wherein reading is the electroencephalogram (EEG) or brainwave activity;
   determining whether the measure of user interaction meets a predetermined criterion; and
   in response to determining that the measure of user interaction meets the predetermined criterion,
   disabling user notification of received communications.

2. The method of claim 1, wherein received communications include one of a telephone call, a text message, instant message, and an email.

3. The method of claim 1, wherein disabling user notification of received communications comprises disabling user notification of received communications at the computing device.

4. The method of claim 1, wherein disabling user notification of received communications comprises disabling user notification of received communications at one or more other computing devices.

5. The method of claim 4, further comprising communicating one or more instructions to the one or more other computing devices to disable user notification of received communications in response to determining that the measure of user interaction meets the predetermined criterion.

6. The method of claim 5, wherein communicating one or more instructions comprises wirelessly communicating the one or more instructions to the one or more other computing devices.

7. The method of claim 6, wherein wirelessly communicating comprises wirelessly communicating via one of BLUETOOTH® communication and WI-FI® communication.

8. The method of claim 4, further comprising:
   determining whether the measure of user interaction does not meet the predetermined criterion; and
   in response to determining that the measure of user interaction does not meet the predetermined criterion, communicating another one or more instructions to the one or more other computing devices to enable user notification of received communications.

9. The method of claim 1, further comprising:
   determining whether the measure of user interaction does not meet the predetermined criterion; and
   in response to determining that the measure of user interaction does not meet the predetermined criterion, enabling user notification of received communications at the computing device.

10. The method of claim 1, further comprising receiving user input identifying the predetermined type of user interaction, and
   wherein the user interaction is measured in response to receipt of the user input identifying the predetermined type of user interaction.

11. The method of claim 1, wherein the user interaction is user interaction with one of work and school related content presented on the computing device.

12. The method of claim 1, further comprising:
tracking eye movement of a user of the computing device; and
determining that the user is reading based on the tracked eye movement, and wherein the measured user interaction is reading by the user.

13. A computing device comprising:
comprising a user notifications manager configured to:
measure user interaction of a predetermined type with the computing device,
wherein the user interaction is one of a user typing on a keyboard of the computing device and
a biometric reading of a user of the computing device;
wherein reading is the electroencephalogram (EEG) or brainwave activity;
determine whether the measure of user interaction meets a predetermined criterion; and
disable user notification of received communications in response to determining that the measure of user interaction meets the predetermined criterion.

14. The computing device of claim 13, wherein received communications include one of a telephone call, a text message, instant message, and an email.

15. The computing device of claim 13, wherein the user notifications manager is configured to disable user notification of received communications at one or more other computing devices in response to determining that the measure of user interaction meets the predetermined criterion.

16. The computing device of claim 15, wherein the user notifications manager is configured to communicate one or more instructions to the one or more other computing devices to disable user notification of received communications in response to determining that the measure of user interaction meets the predetermined criterion.

17. The computing device of claim 13, wherein the user notifications manager is configured to:
determine whether the measure of user interaction does not meet the predetermined criterion; and
communicate another one or more instructions to the one or more other computing devices to enable user notification of received communications in response to determining that the measure of user interaction does not meet the predetermined criterion.

18. The computing device of claim 13, wherein the user notifications manager is configured to:
determine whether the measure of user interaction does not meet the predetermined criterion; and
enable user notification of received communications at the computing device in response to determining that the measure of user interaction does not meet the predetermined criterion.

19. The computing device of claim 13, wherein the user notifications manager is configured to receive user input identifying the predetermined type of user interaction, and
wherein the user interaction is measured in response to receipt of the user input identifying the predetermined type of user interaction.

* * * * *